Patented Apr. 23, 1946

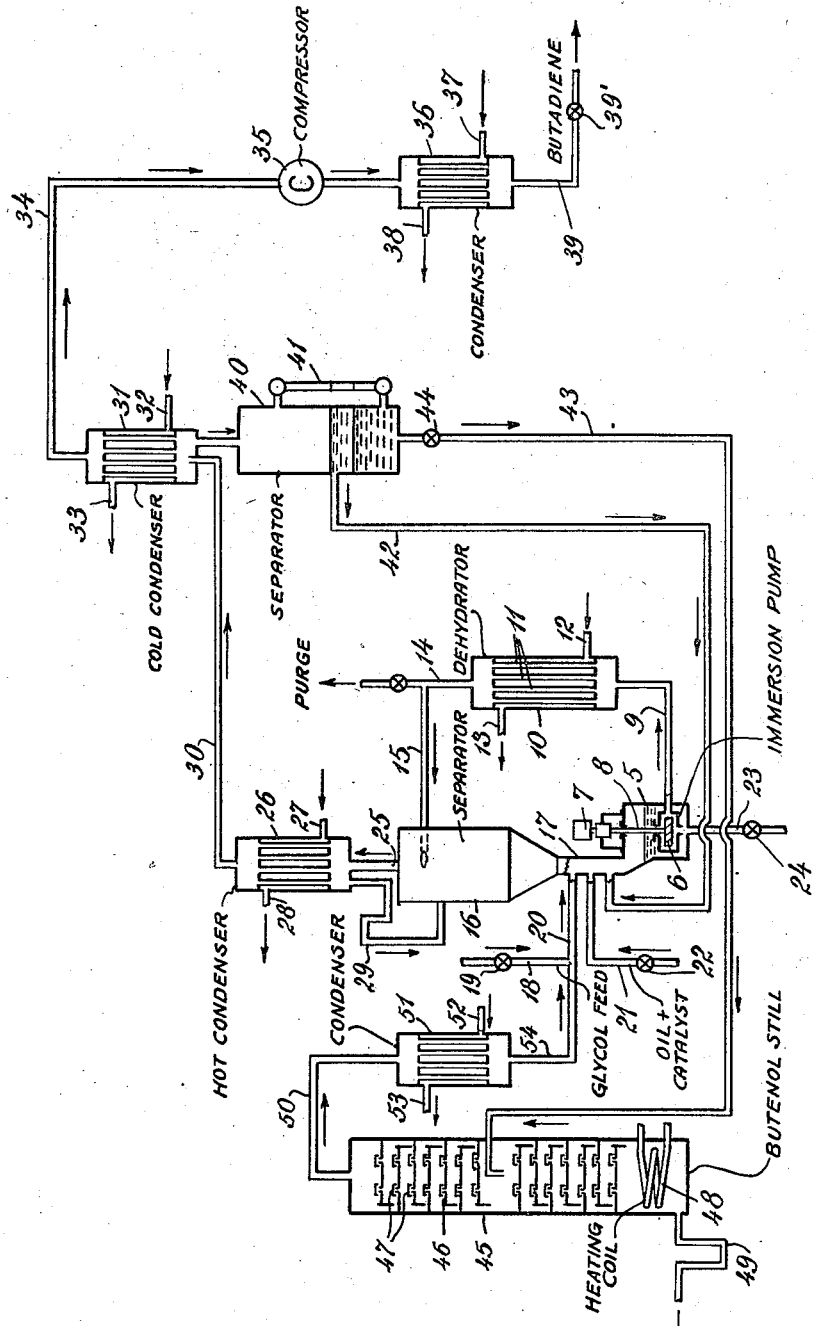

2,399,049

UNITED STATES PATENT OFFICE 2,399,049

PRODUCTION OF BUTADIENE

Thomas H. Manninen, Stamford, Conn., assignor to U. S. Industrial Chemicals, Inc., New York, N. Y., a corporation of Delaware Application November 4, 1944, Serial No. 561,961

7 Claims. (Cl. 260—681)

This invention relates to the production of 1,3-butadiene from 1,3-butylene glycol and particularly to an improved method whereby dehydration of the glycol is effected economically and in a manner permitting commercial recovery of the desired product.

Most of the earlier suggestions concerning the dehydration of 1,3-butylene glycol involve treatment of the glycol in the vapor phase with the aid of a suitable catalyst. These procedures result in excessive decomposition and clogging of the catalyst which must be revivified frequently by burning in oxygen or air to remove carbon therefrom. Such methods are grossly inefficient and commercially impracticable, particularly with respect to the reduction of activity of the catalyst due to carbonization and the necessary repeated burning of the catalyst with resulting loss of activity.

It is the object of the present invention to prepare 1,3-butadiene from 1,3-butylene glycol in a simple, economical and efficient procedure suitable for commercial application.

Another object of the invention is the provision of a method which assures prolonged activity of the catalyst with provision for renewal of the catalyst without interrupting the procedure.

Other objects and advantages of the invention will be apparent as it is better understood by reference to the following specification and the accompanying drawing, which illustrates diagrammatically an apparatus suitable for the practice of the invention.

I have discovered that butadiene can be produced advantageously by introducing 1,3-butylene glycol in relatively low concentrations into a body of inert liquid which is circulated continuously in heat exchanging relation with a heating medium which raises the temperature of the liquid to the desired point. As the inert liquid is circulated, it is continuously withdrawn from the heating zone and the vapor including the butadiene is separated so that the inert liquid can be returned for further additions of the glycol and recirculated through the heating zone. The inert liquid includes a dehydration catalyst which may be dissolved or suspended therein. The glycol is introduced at such a rate as to maintain a low concentration thereof in the circulating inert liquid. The butadiene formed, being gaseous at the temperature of the reaction, is withdrawn continuously with other vapors rising from the body of liquid and is subsequently separated from such vapors. The latter may contain butenol or partially converted glycol which is recovered and returned to the body of inert liquid for further conversion.

The temperature to which the inert liquid is heated will depend somewhat upon the activity of the catalyst, the rate of feed and the kind of liquid used. Temperatures between 220° and 350° C. are most favorable for the reaction, and I prefer to conduct it within the range of 260° to 285° C. If the temperature is as low as 200° C., the reaction becomes too slow for practical commercial operation. If it is permitted to exceed 350° C., there is a tendency toward undesired side and decomposition reactions.

Many different types of liquids may be utilized in the procedure to conduct the glycol through the heating zone. In general, the characteristics of such a liquid should be that it is inert under the conditions of operation, that is that the liquid does not decompose and does not react with the butylene glycol, butadiene or any other products of the reaction or the catalyst employed during the dehydration of the 1,3-butylene glycol. The liquid should not have a boiling point below that of the reaction temperature, although such a liquid may be used, provided the reaction is conducted under pressure. The liquid should be selected from inert organic liquids having the desired characteristics.

It is not necessary that the inert liquid and the butylene glycol should be completely miscible. As already indicated, the temperature to which the inert liquid is raised in the heating zone and the rate of feed of butylene glycol are adjusted so that there is no accumulation of butylene glycol in the inert liquid during the operation, the glycol being converted continuously into butadiene with some relatively small proportion of butenol. It is believed that slight solubility of the butylene glycol in the inert liquid, of the order of 1% or less, is favorable to the reaction, but in this respect I do not wish to be restricted to any particular theory.

Among the inert organic liquids which are suitable for use in the procedure, are diphenyl ethane, hexaethyl benzene, benzyl ether, a mixture of diphenyl and diphenyl oxide known as "Dowtherm," a refined petroleum product known as "Nujol," Texas Co. #531 wash oil, a topped fuel oil having a boiling point of 260°–270° C., Bunker C oil and a higher alcohol known to the trade as "cyclic $C_{18}$ alcohol." It will be observed that the chemical composition of the inert liquid may vary markedly. The essential characteristics have been indicated. Undoubtedly a considerable number of additional organic liquids having similar characteristics and therefore available for the purpose could be selected.

As the catalyst, I prefer to employ "ammonium phosphate." The term "ammonium phosphate" is employed as the general designation of the tri, di and mono ammonium phosphates or mixtures of these salts. It is employed also to include decomposition products of these phosphates which are subject to modification when subjected to temperatures such as those employed in the procedure. Such decomposition products are phosphates, but the precise composition of the salt or salts in the inert liquid at the temperature maintained cannot be determined accurately. Any of the phosphates mentioned or the resulting phosphate compounds in the inert liquid are active catalysts for the reaction.

The catalyst may be introduced to the inert liquid as such, but I prefer to mount it on a suitable finely divided support such as carbon, "Filtercel," "Celite," kaolin or clays and the like. The supported catalyst may be prepared in any of the well known ways, for example by evaporation to dryness of an aqueous solution of the phosphate in contact with the finely divided supporting material while the solution is stirred to ensure uniform impregnation of the support. For example, 6 parts by weight of di-ammonium phosphate are dissolved in about 50 parts of water and added to 12 parts of "Filtercel." The mass is evaporated to dryness with continuous stirring.

The use of a mounted catalyst in general results in more efficient operation, avoiding the possibility that the catalyst may coalesce into masses, although in the present procedure the continuous and active agitation resulting from circulation reduces such a possibility to the minimum. While ammonium phosphate is preferred as a catalyst for the reaction, various other catalysts are available and can be used. Among them are phosphoric acid, toluene sulphonic acid, ammonium sulphate, a mixture of calcium and ammonium phosphates, aniline phosphate, acid sodium phosphate, kaolin and clays such as Attapulgus clay. These catalysts may be used as such or mounted on supports as in the case of ammonium phosphate.

The proportion of catalyst used is largely dependent upon the catalytic area exposed. If the catalytic material is finely divided, less of it is required. It may be necessary to employ up to 50% by weight, based upon the weight of the inert liquid. If, however, the catalyst is finely divided, an amount of 2% by weight of the liquid or even less is required to ensure adequate activity. The fineness of the catalyst and the proportion thereof can be varied within wide limits to secure the desired result.

The procedure will be readily understood by reference to the drawing, it being understood that the apparatus described is merely illustrative of suitable equipment for the purpose. A relatively small chamber 5, adapted to receive the inert liquid including the catalyst and the glycol as fed thereto, encloses an immersion pump 6 which is adapted to be driven by a motor 7 mounted on the chamber through a shaft 8. The pump 6 forces the inert liquid, including the catalyst and the glycol, through a pipe 9 to the heating chamber 10 and through tubes 11 therein wherein it is subjected to heat exchange with a suitable material such as "Dowtherm" circulated through the chamber by means of pipes 12 and 13. The "Dowtherm" may be maintained at a suitable temperature for example within the range between 220° and 350° C., or more preferably between 260° and 285° C., by means of a boiler (not shown). In passing through the tubes 11, the inert liquid including the catalyst and the glycol is heated to the desired temperature at which the reaction occurs actively to effect conversion of the glycol to butadiene. The liquid is delivered through pipes 14 and 15 to a separator 16 in which the vapors are withdrawn from the liquid. The latter returns, through the extension 17, to the chamber 5. Fresh glycol may be introduced as required through a pipe 18 controlled by a valve 19 and delivered to the extension 17 through a pipe 20. The glycol is thus mingled with the inert liquid including the catalyst which is recirculated through the heating zone to effect conversion. Additional inert liquid including the catalyst may be introduced through a pipe 21 controlled by a valve 22 to make up any incidental losses. When the catalyst is exhausted, the liquid containing it may be withdrawn from the chamber 5 through a pipe 23 controlled by a valve 24, and fresh liquid with the catalyst therein may be introduced through the pipe 21. Thus, the procedure may be maintained in substantially continuous operation.

The vapor from the separator 16 rises through a pipe 25 to a condenser 26 which is maintained at a suitable temperature by circulation of liquid such as water through the pipes 27 and 28 to condense any vapors from the inert liquid and unreacted glycol. The condensate returns through a pipe 29 to the separator 16 and thence to the chamber 5.

The uncondensed vapors leave the condenser 26 through a pipe 30 and are delivered to a condenser 31 which is cooled by water or other liquid circulated through pipes 32 and 33, to condense the vapor other than the butadiene. The latter is withdrawn through a pipe 34. It may be delivered in the vapor phase to any suitable receptacle, but preferably is compressed by a compressor 35 to a suitable pressure and subjected to cooling at that pressure in a condenser 36 maintained at the desired temperature by water or other liquid circulating through the pipes 37 and 38. The liquid butadiene is withdrawn through a pipe 39 and valve 39' and delivered to suitable storage facilities. The condensate from the condenser 31 is delivered to a separator 40 having a sight glass 41. It separates into an oily layer and a water layer. The oily upper layer, consisting substantially of butenol, is withdrawn through a pipe 42 and delivered to the extension 17 where it mingles with the fresh glycol and with the inert liquid including the catalyst so that it may be subjected to further reaction.

The lower watery layer, which contains some butenol, is withdrawn through a pipe 43 controlled by a valve 44 and is delivered to a fractionating column 45 having a plurality of trays 46 with the usual bubble caps 47. A heating coil 48 is disposed at the bottom of the column 45 and adapted to be supplied with steam or other heating medium. By fractionation the liquid supplied through the pipe 43 is separated into water which is withdrawn from the bottom of the column through a pipe 49, and vapor consisting of an azeotrope of butenol and water which is delivered from the top of the column through a pipe 50. The vapor passes through a condenser 51 cooled by water or other suitable liquid circulating through the pipes 52 and 53. The condensate is delivered through a pipe 54 to the pipe 20 and thus returns for recirculation with the inert liquid including the catalyst and ultimate conversion to butadiene.

The practical operation of the invention will be readily understood from the following examples:

Example I

A mixture of diphenyl ethane and finely divided ammonium phosphate in the ratio by weight of 25 to 1 is placed in the chamber 5 and circulated through the heating zone. 1,3-butylene glycol is introduced at the rate of ¾ part by weight per hour. The temperature of the circulating liquid is raised to 255–275° C. The butadiene formed is separated and recovered as hereinbefore described. Three-quarters of the input butylene glycol is converted to butadiene and the gas produced averages 95% butadiene. When the rate of feed of butylene glycol is increased to 1⅓ parts by weight per hour the conversion and purity of butadiene is substantially the same.

Example II

A mixture consisting of 250 parts of Texas Co. #531 wash oil and 6 parts of aniline phosphate prepared by mixing aniline and phosphoric acid in the ratio of two mols of aniline to 1 mol of ortho phosphoric acid are circulated with a butylene glycol feed of 9 parts per hour. Gas is produced having a butadiene content of 92% and the conversion of glycol to butadiene was substantially the same as in Example I.

Example III

A suspension of 1 part of catalyst composed of diammonium phosphate mounted on "Filtercel" in about 30 parts of Texas Co. #531 wash oil is circulated and glycol fed thereto at the same rate as in Example II. Butadiene is produced in a yield of 89% with a gas purity of 95%.

The foregoing examples are merely illustrative of the various modifications which can be made in the operation of the invention. Success in the procedure does not depend upon the selection of a specific inert liquid or upon the use of a specific catalyst. The important criteria of the invention are the circulation of a relatively small body of the inert organic liquid including the catalyst and the glycol through a heating zone in which the liquid is raised to the necessary reaction temperature and after which the vapor including the butadiene is separated while the liquid is returned for further circulation. Any dehydration catalyst which will maintain its activity under the conditions of the reaction may be used. The invention is limited, therefore, only with respect to the essential conditions of operation as hereinbefore set forth.

The particular advantages of the invention reside in the fact that only a relatively small body of the inert organic liquid and a proportionally small amount of catalyst in required. Heat transfer to this relatively small body of liquid is materially simplified. The time during which the liquid remains in the heating zone is limited. Hence the formation of polymers and other undesirable products of side reactions is reduced to the minimum. Moreover the rate of flow of the liquid through the heating chamber can be varied readily by varying the speed of the pump. In this manner the optimum rate of feed may be secured in the event of variation of catalytic activity. The apparatus employed is relatively simple and it avoids particularly immersed agitator bearings and other mechanical features which are undesirable in equipment for effecting such reactions. The relatively small immersion pump can be used under the conditions specified without danger of mechanical breakdowns or other factors which might adversely affect the operation.

Various changes may be made in the apparatus employed and in the details of procedure without departing from the invention or sacrificing the advantages thereof.

I claim:

1. The method of producing 1,3-butadiene by dehydration of 1,3-butylene glycol which comprises circulating a body of inert organic liquid including a dehydrating catalyst through and in heat exchange relation with a heating medium whereby the temperature of the inert organic liquid is maintained between 220° and 350° C., feeding the glycol continuously to the inert organic liquid before it is subjected to heat exchange relation with the heating medium, withdrawing vapor from the inert organic liquid after the heat exchange, separating butadiene from the vapor and returning the inert organic liquid for recirculation with the continuously fed glycol.

2. The method of producing 1,3-butadiene by dehydration of 1,3-butylene glycol which comprises circulating a body of inert organic liquid including a dehydrating catalyst through and in heat exchange relation with a heating medium whereby the temperature of the inert organic liquid is maintained between 220° and 350° C., feeding the glycol continuously to the inert organic liquid before it is subjected to heat exchange relation with the heating medium, withdrawing vapor from the inert organic liquid after the heat exchange, condensing the vapor, separating butadiene from the condensate and returning the inert organic liquid and a portion of the condensate for recirculation with the continuously fed glycol.

3. The method of producing 1,3-butadiene by dehydration of 1,3-butylene glycol which comprises circulating a body of inert organic liquid including a dehydrating catalyst through and in heat exchange relation with a heating medium whereby the temperature of the inert organic liquid is maintained between 220° and 350° C., feeding the glycol continuously to the inert organic liquid before it is subjected to heat exchange relation with the heating medium, withdrawing vapor from the inert organic liquid after the heat exchange, condensing the vapor, separating butadiene from the condensate, separating the condensate into oily and watery layers, removing water from the watery layer and returning the oily layer and the residue freed from water with the inert organic liquid for recirculation with the continuously fed glycol.

4. The method of producing 1,3-butadiene by dehydration of 1,3-butylene glycol which comprises circulating a body of inert organic liquid with a dehydration catalyst suspended therein through and in heat exchange relation with a heating medium whereby the temperature of the inert organic liquid is maintained between 220° and 350° C., feeding the glycol continuously to the inert organic liquid before it is subjected to heat exchange relation with the heating medium, withdrawing vapor from the inert organic liquid after the heat exchange, separating butadiene from the vapor and returning the inert organic liquid for recirculation with the continuously fed glycol.

5. The method of producing 1,3-butadiene by dehydration of 1,3-butylene glycol which comprises circulating a body of inert organic liquid with a dehydration catalyst supported on a carrier suspended therein through and in heat exchange relation with a heating medium whereby the temperature of the inert organic liquid is maintained between 220° and 350° C., feeding the glycol continuously to the inert organic liquid before it is subjected to heat exchange relation with the heating medium, withdrawing vapor from the inert organic liquid after the heat exchange, separating butadiene from the vapor and returning the inert organic liquid for recirculation with the continuously fed glycol.

6. The method of producing 1,3-butadiene by dehydration of 1,3-butylene glycol which comprises circulating a body of inert organic liquid including a dehydrating catalyst through and in heat exchange relation with a heating medium whereby the temperature of the inert organic liquid is maintained between 260° and 285° C., feeding the glycol continuously to the inert organic liquid before it is subjected to heat exchange relation with the heating medium, withdrawing vapor from the inert organic liquid after the heat exchange, separating butadiene from the vapor and returning the inert organic liquid for recirculation with the continuously fed glycol.

7. The method of producing 1,3-butadiene by dehydration of 1,3-butylene glycol which comprises circulating a body of inert organic liquid including a dehydrating catalyst through and in heat exchange relation with a heating medium whereby the temperature of the inert organic liquid is maintained between 260° and 285° C., feeding the glycol continuously to the inert organic liquid before it is subjected to heat exchange relation with the heating medium, withdrawing vapor from the inert organic liquid after the heat exchange, condensing the vapor, separating butadiene from the condensate and returning the inert organic liquid and a portion of the condensate for recirculation with the continuously fed glycol.

THOMAS H. MANNINEN.